United States Patent Office 2,865,756
Patented Dec. 23, 1958

2,865,756

FRUIT FLAVORS, PRODUCTS, AND METHODS

Joseph Merory, Lake Hiawatha, N. J., assignor to Shulton, Incorporated, a corporation of New Jersey No Drawing. Application February 17, 1954
Serial No. 411,003

15 Claims. (Cl. 99—78)

This invention relates to fruit flavors, methods of making them, and products containing such flavors, and particularly to fruit flavors faithfully retaining the flavor of the fruits from which they are derived although substantially free from the sugar content normally present in said fruits.

Fruit flavors have been manufactured and used for a number of years and the processes by which they are produced are well known. Furthermore, artificial fruit flavors containing no sugars are also available and have been known for a number of years. However, in no instance has a completely constituted true fruit flavor been produced or offered for sale which at the same time is completely free of sugar. For instance, by a process of evaporation and condensation, the so-called "aromatic essence" of fruit flavors may be removed by distillation to give a type of non-artificial fruit flavoring. By its very nature, however, such a flavoring is not complete and is not an authentic replica of the original fruit flavor since certain of the other flavor extractives normally present in the fruit are missing. On the other hand, concentrated fruit flavors have been made available by a process which consists essentially of evaporating a great part of the water content of the fruit juice but this product contains large proportions of the natural fruit sugars and by its nature is far from non-calorific.

The advantages of a sugar-free authentic fruit flavor are manifold. They are extremely useful in the construction of dietary beverages and food products to be used by those individuals who are restricted in their calorific intake. Furthermore, sugar-free flavors of fruit when used in foodstuffs and in beverages allow a great degree of freedom in the addition of sweetening agents or sugar to suit the individual taste and requirement. On the other hand, certain foodstuffs may be formulated with greater ease and technical precision when the large amounts of natural fruit sugars which are normally present in the heretofore available fruit flavors are absent.

In order to produce a fully constituted authentic fruit flavor which at the same time is sugar-free, a method must be devised whereby the sugar is removed or destroyed from the natural fruit or fruit juice in some economical manner. In wine making, a pressed fruit or fruit juice is fermented and in the process of fermentation the sugar is destroyed and converted into alcohol. But at the same time, the flavor is radically changed from a typically fresh fruit flavor to a winy tasting product. Furthermore, if this fermented fruit juice is then distilled to remove the aromatic essence of the wine and incidentally the alcohol, the distilled product is a type of brandy and the residue is an unpalatable product having no commercial value. Furthermore, the fermentation of the fresh fruit or fruit juice gives a wine-flavored product which is somewhat dilute and lacking the full value of a composition which is designed as an exclusive flavoring agent. On the other hand, if fresh fruit or fruit juice is evaporated, a concentrate is formed which is lacking the complete original flavor since all of the aromatic essence is lost in the evaporation process.

Among the objects of the present invention is the production of true fruit flavors free of the natural sugar content derived from the fruit.

Other objects include such fruit flavors having adjuvants to modify their natural flavor.

Further objects include food products containing such fruit flavors both natural and modified.

Still further objects include methods of making such fruit flavors and modified fruit flavors, and food products containing them.

Still further objects and advantages of the present invention will appear from the more detailed description set forth below, it being understood, however, that this more detailed description is given by way of illustration and explanation only, and not by way of limitation, since various changes therein may be made by those skilled in the art without departing from the spirit and scope of the present invention.

In accordance with the present invention, it has been found possible to produce natural fruit flavors free of the sugar content normally present in such flavors from the fruit source used. Such fruit flavors thus produced may be generally described as consisting essentially of a fruit-derived aromatic essence and a sugar-free flavor-pressing of a fermented mixture of a fresh fruit complement and an aromatic-essence-depleted, or substantially aromatic-essence-depleted, fruit concentrate. These fruit flavors produced in accordance with the present invention are widely useful in the production of food products including beverages, both still and carbonated, both of dietary type and of normal type. Since they are free of the normal sugar content derived from the fruit source, they may be modified in any desired way for the purposes desired.

They may be used as such without added sweetening agents or by the addition of non-sugar sweetening agents with or without natural flavoring components or food-permissible aromatic chemicals or both, in the production of dietary food products; or with sugar type sweetening agents with or without natural flavoring components or food-permissible aromatic chemicals or both in the production of non-dietary type food products. By the inclusion of any or all of such adjuvants new fruit-base flavors are made possible.

The fruit flavors of the present invention may be used for the constitution or for the flavoring of alcoholic beverages as well as carbonated or non-carbonated dietary preparations and the flavorings for dietary foodstuff preparations. In order to impart sweetness to the foodstuffs in which the flavorings are used, non-sugar type sweetening agents such as 4-ethoxyphenyl urea, saccharin, or sodium or calcium cyclohexylsulfamate, and the like, may be added. In some cases, minor amounts of sugar, sorbitol, mannitol, and the like, may be included.

Although the process of the present invention is primarily intended to supply a sugar-free authentic fruit flavor, the flavorings derived are of such fine value and have such authentic taste that regular sugar-containing fruit flavors may be constituted from the sugar-free fruit flavors of this invention by adding back the requisite amount of sugar and sugar syrup. By so doing, manifestly superior flavors in regard to authenticity and duplication of the natural fruit are obtained. By compounding the amount of fermented flavor with the aromatic essence and sugar or sugar syrup, many different types of fruit flavors possessing somewhat different flavor value may be obtained. The present invention is novel not only in that exact duplication of the fresh fruit flavor may be obtained but also by suitable compounding, new flavor types may be developed which have great interest from the commercial beverage and foodstuff flavoring point of view.

A variety of fruits may be used in the production of fruit flavors in accordance with the present invention. The term "fruit" is used herein in its commonly accepted meaning applied to the fleshy type fruits. Or they may be said to be such fruits as contain substantial flavor bodies utilized in the production of fruit flavors and essences and may be grouped under the term of aromatic-essence containing fruits. They may be illustrated by raspberry, cherry, blackberry, grape, strawberry, peach, banana, pineapple, apple, pear, and the like. The invention will be illustrated by the production of fruit flavors from raspberries and cherries but the processes and examples may be applied to any other fruits containing such essences.

The process desirably used in producing such fruit flavors free of sugar from the fruit source consists essentially in distilling off the aromatic essence from the fruit component leaving a residue which is then vacuum distilled to remove a substantial amount of water and concentrate the sugar content. This concentrated syrup is then added to a fresh fruit complement such as crushed fresh fruit or expressed juice and the fortified mixture is fermented to completely convert all of the sugars resident therein. The fermented material is then pressed to yield a flavor concentrate which is blended with the aromatic essence which had previously been removed. In this manner, a concentrated authentic fruit flavor is produced containing no free sugar. It is essential to follow the steps of the present invention in the order in which they have been described above since any variation will result in either a wine type of product or a flat relatively tasteless juice concentrate. Of course, many variations may be made in the process while still adhering to the vital steps necessary to produce the fully constituted sugar-free fruit flavor. In any event, however, whether this aromatic essence is derived from the original fruit or fruit juice or from a by-product of the fruit, a preliminary distillation, with or without alcohol added, is necessary. The alcohol may be commercial alcohol or it may be a brandy derived from the distillation of a fruit wine. It should also be noted that after the essential aromatic essence is removed from the fruit or fruit juice that the concentration should be carried out under a high vacuum of not lower than 28 inches or 711 mm. and heated by a water bath to prevent the development of off odors and flavors.

The fruit component used may be employed in any form containing its aromatic essence. Thus it may be the fresh fruit itself, or it may be a fruit juice expressed from such fresh fruit. Or the aromatic essence may be obtained from by-products of fruit pressing, such as fruit pits which develop flavor by enzymatic action. Whatever source is used for the aromatic essence, however, the process steps outlined are essential in the production of the desired flavors.

In the examples, it is found advantageous to add alcohol to the fruit juice and then to distill to remove the aromatic essence. However, it is also possible, and in some cases highly desirable, to add alcohol directly to the crushed fruit and distill the entire mixture. In this manner, an aromatic essence of somewhat different flavor is obtained due to the fact that the flavoring is derived not only from the juice but also from the fruit peels, skins, etc. On the other hand, it is not absolutely necessary to employ alcohol in removing the aromatic essence. If it appears desirable, the fresh fruit or expressed juice may be distilled under high vacuum with sufficient condensation in order to collect this aromatic essence. In the latter case, a relatively high vacuum must be employed and good cooling should be used in the condensing system in order to collect even the most volatile of the aromatic essence flavors. In Example 1, it will be noted that a mixture of both the red and black raspberries were employed. Similar procedures can also be desirably used with other fruits to obtain the best type of flavoring. For instance, the most valuable aromatic essence is derived from the red raspberries with only minor amounts derivable from the black raspberries. On the other hand, black raspberries have a much greater value in their non-volatile extractives and consequently impart to the fermented concentrate a highly desirable flavor.

*Example 1*

2,400 lbs. of black raspberries are mixed with 10 gals. of 95% ethyl alcohol or brandy of raspberry of equivalent alcohol contents. The fruit and alcohol mixture was then expressed to yield 200 gals. of black raspberry juice. The pressed remains are stored and designated as residue G-1. The black raspberry juice is then distilled at atmospheric pressure to obtain 1 gal. of flavored distillate (flavor distillate A) which contains the volatile aroma. Distillation is then stopped and the juice cooled to approximately 25° C. Vacuum is applied (28–30 in.) and 40–50 gals. distillate is removed until the juice is alcohol-free. This distillate is then redistilled without vacuum to obtain approximately 12 gals. of an alcoholic flavor distillate of higher proof (flavor distillate J). The vacuum distillation of the juice is then continued until there is obtained approximately 24–30 gals. of juice concentrate having a 36–38° Baumé sugar content (concentrate B).

1,800 lbs. of red raspberries were mixed with 5 gals. of 95% ethyl alcohol and 12 gals. of flavor distillate J were then added. The fruit and alcohol mixture was then expressed to yield approximately 197–200 gals. of a raspberry juice. (Pressed remains are stored and designated as residue G2.) For separation of volatile aroma, this juice was then distilled at atmospheric pressure to obtain 3 gals. of a flavor distillate (flavor distillate C). The distillation was then stopped and the juice cooled to 25° C. A vacuum was applied and distillation continued to obtain 50 gals. of distillate or until no more alcohol came over from the juice in the still. This distillate is called flavor distillate D. The main distillation was continued under vacuum in order to concentrate the juice to a volume of 18–20 gals. with a sugar concentration of 36–40° Baumé (concentrate E).

2,200 lbs. red raspberries or 2,000 lbs. mixture of red and black raspberries, 28–30 gals. of concentrate B and 18–20 gals. of juice concentrate E were placed in a fermentation tank. A yeast culture was added and the mixture fermented until all of the sugar had been converted into alcohol. After fermentation, the mixture was pressed to yield approximately 225 gals. of concentrate (concentrate F). The pressed remains are designated as residue G3.

Residues G1, G2, G3 and 50 gals. of distillate D were mixed and the mixture distilled without vacuum to obtain 10–12 gals. of flavor distillate H.

In using the materials obtained from the various steps described above, a completely constituted sugar-free true fruit flavor of raspberry was compounded as follows:

225 gals. concentrate F
12 gals. distillate H
1 gal. distillate A
3 gals. distillate C There is thus obtained 241 gals. of sugar-free fruit flavor concentrate containing approximately 17% alcohol and being equivalent to approximately 26.6 lbs. of fresh raspberries per gallon of flavor concentrate.

The quantity of 26.6 lbs. of fresh raspberry fruit per gallon of concentrate is that concentration which can be considered the minimum of acceptable flavor strengths for commercial use with the further addition of so-called natural flavorings. Other combinations and proportions of such concentrates and distillates may be made.

*Example 2*

200 lbs. of cherries were mixed with 4 gal. 95% alcohol or brandy of cherry of equivalent alcohol content and pressed. 20–22 gal. and 24 lbs. of pressed remains were set aside for future use (residue A). The expressed juice was distilled at atmospheric pressure to remove ½ gal. of aromatic essence (flavor distillate F) containing volatile flavor. The remaining juice was vacuum distilled until a cherry concentrate of 36–40° Baumé sugar content was obtained. The recovered alcohol of this fraction is put aside and called distillate D. The cherry concentrate was mixed with 200 lb. of cherries, 110 lb. of imported Dalmatian cherries and a yeast culture. The mixture was placed in a fermentation tank and fermented. After a period of time, a sample was taken out and analyzed to determine the alcohol and surgar content. When no more sugar could be detected, the fermentation was terminated and the contents of the tank pressed to yield approximately 22 gals. of concentrate (concentrate B). The pressed remains were stored for future use (residue C). Residue C, which contains the cherry pits, was crushed. It was then mixed with 8 gals. of water, warmed, and agitated, and then left at 55° C. to stand for about 24 hours. The crushed pits of the residue developed a cherry aromatic essence by enzymatic action. After a total of 24 hours had elapsed, the flavor distillate D and the 24 lbs. residue A were added and the mixture distilled to yield 2½ gals. of distillate (flavor distillate E).

A fully constituted authentic sugar-free cherry fruit flavor was obtained by compounding 22 gals. of the concentrate B and 2½ gals. of flavor distillate E and ½ gal. flavor distillate F to yield 25 gals. of sugar-free fruit flavor with an alcohol content of approximately 20% and being equivalent to 31.4 lbs. of fresh cherries per gallon of fruit flavor. 1 lb. of dried cherries was the equivalent of 2.75 lb. fresh cherries. The quantity of 30 lbs. of fresh cherries per gal. of flavor concentrate is that concentration which can be considered the minimum of acceptable flavor strengths for commercial use without the further addition of so-called natural flavorings.

*Example 3*

The sugar-free authentic fruit flavors of the present invention are devoid of any sweet flavoring. In order to provide a flavoring material directly suitable for beverages, and especially dietary beverages and foods, the following compositions were prepared:

(a) 100 gals. of the sugar-free raspberry flavor described in Example 1 were mixed with 150 lbs. of sodium cyclohexylsulfamate and stirred until a clear product was obtained.

(b) 100 gals. of the sugar-free cherry fruit flavor of Example 2 were mixed with 160 lbs. of calcium cyclohexylsulfamate and mixed well until a homogeneous solution was formed.

*Example 4*

The products of the present invention are especially useful in the preparation of flavored foodstuffs and dietary or non-calorific beverages. The following composition illustrates the preparation of a suitable raspberry beverage:

40 gal. water
½ lb. sodium benzoate
6 lbs. pectin N. F.
12 lbs. sodium cyclohexylsulfamate
6 gal. sugar-free raspberry flavor of Ex. 1
100 oz. 50% citric acid
Color to suit
Water to make 100 gal. of beverage The beverage is bottled and carbonated with an appropriate amount of carbon dioxide gas.

*Example 5*

The sugar-free fruit flavor of raspberry or cherry may be fortified with natural flavorings such as essential oils and botanical extracts to create a so-called "sugar-free fruit flavor with natural flavors." The following composition illustrates the preparation of a suitable "sugar-free cherry fruit flavor with other natural flavors" per 1 gal. of finished mixture:

20 g. oil of bitter almond (free from prussic acid)
8 oz. alcohol distillate of wild cherry bark (botanical)
76.8 oz. sugar-free fruit flavor of Example 2 (in accordance with existing regulations of the FDA, this quantity corresponds to 51% of natural cherry flavor in the total mixture)

Add the desugared grape extract, caramel color or certified colors which are dissolved in water to obtain a total of 1 gal. of finished flavor.

*Example 6*

The sugar-free fruit flavor such as that of raspberry or cherry may be fortified with aldehydes, esters, ethers, ketones and other food permissible aromatic chemicals, to produce a so-called "sugar-free cherry fruit flavor and imitation flavor." The following composition illustrates the preparation of a suitable "sugar-free cherry fruit flavor and imitation flavor."

2 oz. benzaldehyde
1 oz. tolylaldehyde
1 pt. solvent (alcohol 95% or propylene glycol)
1 pt. catechu extract
Q. S. sugar-free cherry fruit flavor to obtain: 1 gal. of finished sugar-free cherry fruit flavor and imitation flavor Having thus set forth my invention, I claim:

1. The method of producing sugar-free fruit flavor consisting essentially of distilling off the aromatic essence from a fruit component selected from the group consisting of raspberry, cherry, blackberry, grape, strawberry, peach, banana, pineapple, apple and pear containing sugar and aromatic essence, subjecting the residue from said distillation step to vacuum distillation to concentrate the same and increase its sugar content, mixing said concentrate with an essence-containing fresh fruit complement selected from the group consisting of crushed fruit and expressed juice of raspberry, cherry, blackberry, grape, strawberry, peach, banana, pineapple, apple and pear, fermenting said mixture to remove sugar therefrom, pressing the fermented mixture to separate a sugar-free concentrate from the fermented mixture, and adding the distilled aromatic essence to said sugar-free concentrate to produce a fully constituted sugarless fruit flavor.

2. The method of claim 1 in which the fruit component is fresh fruit.

3. The method of claim 1 in which the fruit component is fresh fruit juice.

4. The method of claim 1 in which the fruit component is an enzymatically produced flavor in a non-edible portion of said fruit component.

5. The method of claim 1 in which the distillation step for recovery of aromatic essence is carried out without adding alcohol thereto.

6. The method of claim 5 in which the fruit component is fresh fruit.

7. The method of claim 5 in which the fruit component is fresh fruit juice.

8. The method of claim 5 in which the fruit component is an enzymatically produced flavor in a non-edible portion of said fruit component.

9. The method of claim 1 in which the distillation step for recovery of aromatic essence is carried out in the presence of alcohol.

10. The method of claim 9 in which the fruit component is fresh fruit.

11. The method of claim 9 in which the fruit component is fresh fruit juice.

12. The method of claim 9 in which the fruit component is an enzymatically produced flavor in a non-edible portion of said fruit component.

13. The method of claim 1 which includes the further step of incorporating a non-sugar sweetening agent in proportions to produce a sweetened sugar-free fruit flavor.

14. The method of claim 1 which includes the further step of incorporating a sugar sweetening agent in proportions to produce a sweetened fruit flavor.

15. The product produced by the method of claim 1.

References Cited in the file of this patent
UNITED STATES PATENTS

| | | |
|---|---|---|
| 1,071,238 | Jung | Aug. 26, 1913 |
| 2,419,286 | Rooker | Apr. 22, 1947 |
| 2,629,665 | Gordon | Feb. 24, 1953 |